UNITED STATES PATENT OFFICE.

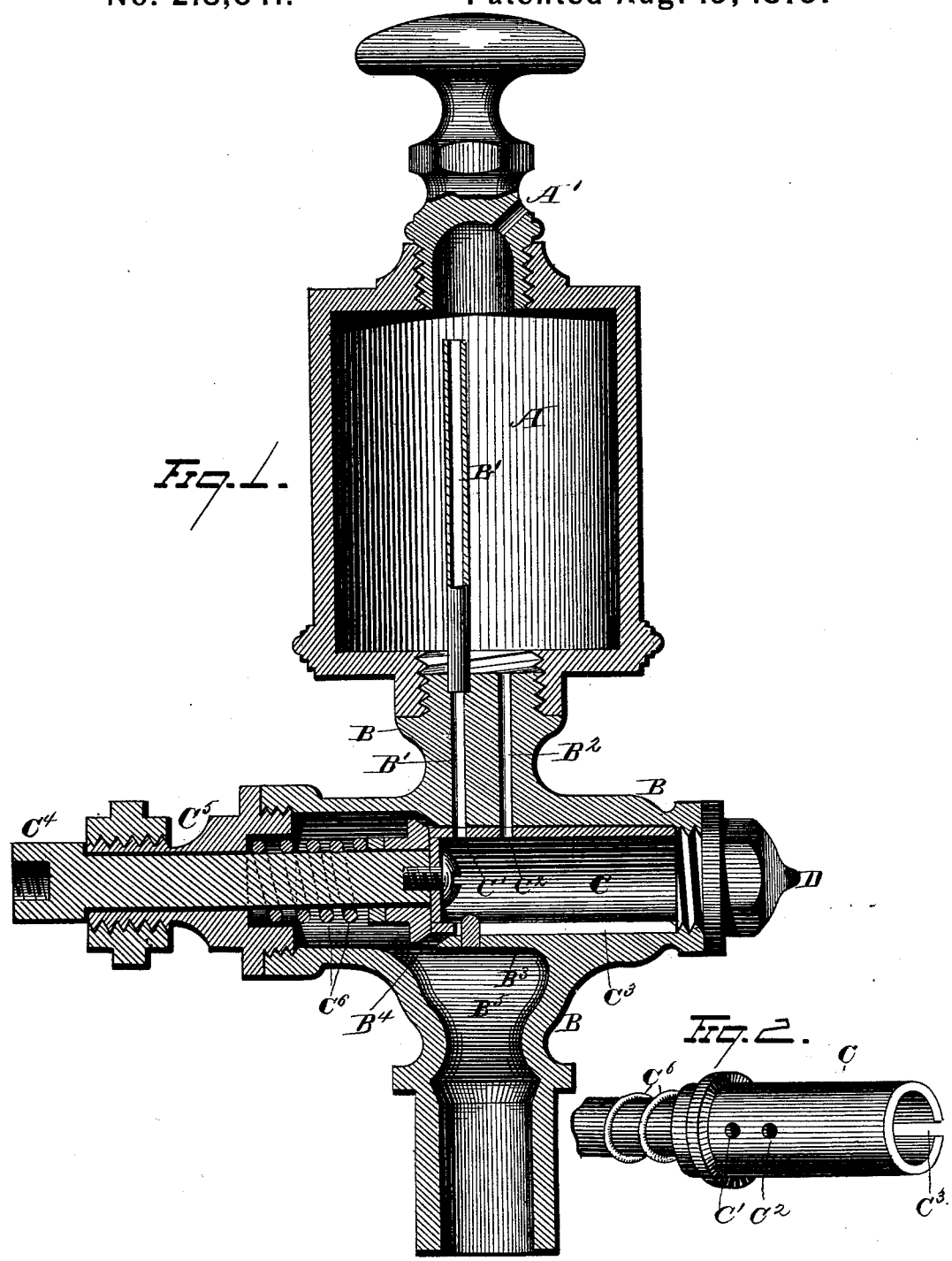

EDGAR ROBINSON, OF DENNISON, OHIO.

IMPROVEMENT IN OIL-CUPS.

Specification forming part of Letters Patent No. 218,641, dated August 19, 1879; application filed December 18, 1878.

*To all whom it may concern:*

Be it known that I, EDGAR ROBINSON, of Dennison, in the county of Tuscarawas and State of Ohio, have invented certain new and useful Improvements in Oil-Cups; and I do hereby declare the following to be a full, clear, and exact description of the invention, such as will enable others skilled in the art to which it pertains to make and use it, reference being had to the accompanying drawings, which form part of this specification.

My invention relates to oil-cups; and it consists principally in the arrangement with an adjustable measure of device and apparatus whereby said measure may be automatically filled and discharged without either of these operations interfering with each other.

In the drawings, Figure 1 represents a longitudinal section of a device constructed according to my invention; Fig. 2, a detached view of the adjustable measure adapted to said device.

A is the main or primary reservoir for containing the lubricant. A' is a vent or air-hole, made preferably through the upper portion of the reservoir A. This reservoir may be made of any suitable material and of any size to contain any desired amount of oil. It is attached to a seat, B, in any suitable manner. Through this seat B two ports, $B^1 B^2$, are made. The port $B^1$ serves merely as a vent to the adjustable measure C, with whose interior it connects. The vent $B^1$ is continued as a tube, which opens at or near the top of the chamber of the reservoir A.

In use the reservoir A should never be filled so full as to endanger an overflow of oil into the tube $B^1$. The port $B^2$ also connects the reservoir A at its bottom with the interior of the adjustable measure C; and this port serves merely to conduct oil from said reservoir to the measure C.

The adjustable measure C referred to is made preferably in the shape of a cylinder, although the mere cylindrical form of the measure is not a matter of importance, and in point of shape and dimensions may be varied as fancy or necessity may dictate.

Opening through the body of the measure C are the perforations $C^1 C^2$, which are made to register with the lower openings of the ports $B^1 B^2$, respectively.

On the lower side of the measure C is made a slotted opening, $C^3$, and through the floor $B^3$ of the seat B is made the port $B^4$, adapted to connect, at a time and in the manner hereinafter to be specified, with the interior of the measure and the chamber $B^5$ of the seat B.

The chamber $B^5$ is open at its bottom, and, by suitable pipe or other connection, is made to connect with any joint, journal, or other part necessary to be lubricated.

$C^4$ is a stem attached to the measure C, and made to pass through suitable boxing $C^5$.

A spring, $C^6$, operates to retain the parts in the relative position shown in Fig. 1.

As before mentioned, the measure C is made of such a size and capacity as to measure the oil, allowing just such an amount as may be previously decided upon to flow into the lower chamber, $B^5$, and from thence to the part to be oiled. The amount of oil allowed to flow at each oiling may be regulated by making the end of the nut D long enough to partially fill the cavity of the measure C, and to the extent that the nut D fills the measure will be determined the amount of oil that the measure will hold, said amount being less and less as the plug D is driven farther and farther in, and vice versa.

The operation of my device is as follows: When the parts are in the position shown in Fig. 1 oil will flow from the reservoir A through the port $B^2$ and opening $C^2$, and fill the cavity of the measure C, from which it will not escape until the journal, steam-chest, or the like to which it is applied, is desired to be oiled. To discharge the oil from the measure C it is only necessary to draw it longitudinally by pulling upon the stem $C^4$, which, instead of being of the form shown in Fig. 1, may have a screw-thread upon its body, by turning which will operate to draw the measure C in the same manner as the pulling operation just above mentioned. When the stem $C^4$ is drawn the measure C is also drawn in such a manner as to discharge its contents through the slotted opening $C^3$ and port $B^4$ into the chamber $B^5$. At the same time the openings $C^1$ and $C^2$ are so placed as not to register or communicate in any manner with the reservoir A, thus preventing the escape of steam (in case this device is used upon a steam chest or cylinder) up into the reservoir A or its contents. After the contents of the measure C have been discharged it is allowed to return to its original position, when it is promptly filled from the contents of the reservoir A, as above described.

I do not limit myself to the exact relation of parts as shown in the drawings. The measure C, instead of being horizontally placed, may be set at an angle or in a vertical position, and adapted, by suitable connections with the reservoir A and chamber $B^5$, to be filled and discharged in substantially the same manner as already specified; nor do I limit myself narrowly to any specific method of making the measure C adjustable, so as that it shall be made to contain more or less oil at pleasure.

What I claim is—

1. The combination, with an oil-reservoir, of a measure, C, adapted to be moved lengthwise, and thus brought in communication with the oil-reservoir or the oil-discharge conduit, substantially as set forth.

2. The combination, with an oil-reservoir, of a measure, C, adapted to be moved lengthwise, said measure provided with ports on one side thereof, which may connect with passages leading to the oil-reservoir, and with an elongated slot, which may connect with the discharge-conduit, substantially as set forth.

3. The combination, with an oil-reservoir, of a measure, C, adapted to be moved lengthwise, and a spring-pressed stem or rod attached to one end of said measure, substantially as set forth.

In testimony whereof I have signed my name to this specification in the presence of two subscribing witnesses.

EDGAR ROBINSON.

Witnesses:
JNO. CROWELL, Jr.,
WILLARD FRACKER.